(12) United States Patent  
Sorribes Arambul

(10) Patent No.: US 8,227,679 B2  
(45) Date of Patent: Jul. 24, 2012

(54) MUSICAL STAVE READER FOR CHILDREN

(75) Inventor: Manuel Sorribes Arambul, Catarroja (ES)

(73) Assignee: Hogueit, S.L., Valencia (ES)

( * ) Notice: Subject to any disclaimer, the term of this patent is extended or adjusted under 35 U.S.C. 154(b) by 35 days.

(21) Appl. No.: 12/921,219

(22) PCT Filed: Mar. 10, 2009

(86) PCT No.: PCT/ES2009/000129  
§ 371 (c)(1), (2), (4) Date: Sep. 7, 2010

(87) PCT Pub. No.: WO2009/112611  
PCT Pub. Date: Sep. 17, 2009

(65) Prior Publication Data  
US 2011/0011240 A1 Jan. 20, 2011

(30) Foreign Application Priority Data

Mar. 11, 2008 (ES) .................................. 200800703

(51) Int. Cl.  
*G09B 15/08* (2006.01)

(52) U.S. Cl. .......................................................... 84/478

(58) Field of Classification Search ................ 84/470 R, 84/477 R, 478  
See application file for complete search history.

(56) References Cited

U.S. PATENT DOCUMENTS

| | | | | |
|---|---|---|---|---|
| D278,917 S | * | 5/1985 | Sinkoff et al. ................ D17/1 |
| 5,145,447 A | * | 9/1992 | Goldfarb ..................... 446/408 |
| 5,545,071 A | * | 8/1996 | Shiraishi ...................... 446/143 |
| 5,668,333 A | * | 9/1997 | Horton et al. ................ 84/470 R |
| 6,142,849 A | * | 11/2000 | Horton et al. ................ 446/175 |
| 6,204,441 B1 | * | 3/2001 | Asahi et al. ................. 84/470 R |
| 6,337,434 B2 | * | 1/2002 | Oren-Chazon ................ 84/478 |
| 6,605,767 B2 | * | 8/2003 | Fiks et al. ................... 84/423 R |
| 6,727,417 B2 | * | 4/2004 | Oren-Chazon ............. 84/470 R |
| 7,161,080 B1 | * | 1/2007 | Barnett ......................... 84/613 |
| 8,008,563 B1 | * | 8/2011 | Hastings ..................... 84/479 A |
| 2003/0084777 A1 | * | 5/2003 | Gaudet ....................... 84/470 R |
| 2011/0179940 A1 | * | 7/2011 | Humphrey .................. 84/470 R |

FOREIGN PATENT DOCUMENTS

| | | |
|---|---|---|
| ES | 8407350 | 6/1984 |
| GB | 539987 | 10/1940 |
| GB | 2091019 | 7/1982 |

OTHER PUBLICATIONS

International Search Report for PCT/ES2009/000129. Issued on Jun. 22, 2009.

* cited by examiner

*Primary Examiner* — Jeffrey Donels  
(74) *Attorney, Agent, or Firm* — Brown & Michaels, PC

(57) ABSTRACT

The invention relates to a musical stave reader for children formed by a lower casing (1) and an upper casing (2) on which the keyboard (3) of buttons and LEDs is placed, which keyboard is in turn divided into an upper area (4), a central area (5) and a lower area (6), a loudspeaker (7), an integrated base plate, a processor (8), and incorporating a socket for headphones (9), wherein the upper part of the keyboard (4) shows the musical stave (41), the central part of the keyboard (5) incorporates another musical stave with the distribution of the notes in a harmonic or vertical manner (51), and the lower part (6) of the keyboard contains the control buttons for the higher functions of lessons and games of the advanced operation mode, which is formed by eleven buttons and ten LEDs.

24 Claims, 3 Drawing Sheets

MUSICAL STAVE READER FOR CHILDREN

OBJECT OF THE INVENTION

The present musical stave reader for children is a tool for teaching musical language, designed as an aid the purpose of which is for the child/user to assimilate, and make his own, the stave model through a series of activities containing lessons and games, wherein the ergonomic shape of the product has been created to take advantage of the fact that many children are familiar with electronic toys and are used to using the thumbs of their hands to press the buttons of the electronic toy. For this reason, the shape and the dimensions of the product are adapted to the hands of children so that they can hold the product easily.

A musical product the main feature of which is that of being able to play, as if it were an organ, melodies or fragments of melodies, facilitating the playing thereof given that the buttons form part of the structure itself of the stave and the playing is carried out with the thumbs.

BACKGROUND OF THE INVENTION

Currently, the traditional method for teaching music to children and beginners is based, like for any language, on learning and recognizing the different musical notes, the position thereof in the stave, the sound they represent by means of the emission thereof by a musical instrument, normally the sound of a piano, and based on this memorizing individual elements, musical scales, chords, their combinations and starting to read phrases, melodies, etc.

Today, children are especially used to handling programmed electronic apparatuses, in which they quickly receive a large amount of visual, sound, agility and early response stimuli. All this leads to the aforementioned methods being a tedious and boring task for children, so many decide to abandon a subject which initially attracted them.

For the purpose of facilitating learning, the inventor himself already designed in the year 1984 games and implements which livened up this process, the starting point of which is a board divided into portions and into a series of circular sectors which are in turn divided into concentric annular portions, and respectively including boxes with the musical notes which the child memorizes by playing.

For the purpose of stimulating and facilitating the learning of music, the creator of the present invention is not aware of the existence of any musical instruments or toys with the considerations of the musical stave reader for children which enables the material option of playing melodic sounds by pressing on the notation itself of the stave.

DESCRIPTION OF THE INVENTION

The invention relates to a musical stave reader for children, in which melodies or fragments of melodies are played (as if it were an organ), facilitating the playing thereof like no toy or material has done up until now given that the buttons form part of the structure itself of the stave and the playing is carried out with the thumbs, seeing from its different sections the names and the place occupied by the musical notes in the stave, always accompanied by their respective sounds.

The product is formed by the following parts: keyboard with buttons and LEDs, loudspeaker, headphones, electronics, computer applications, casings and envelopments made of plastic.

In relation to its functionality, the keyboard can be divided into three large groups of buttons:
those of the upper part,
those of the central part, and,
those of the lower part.

The upper part of the keyboard shows the musical stave in treble clef with thirteen LEDs in the positions of the musical notes and, below the stave, there are four buttons serving to select as many other musical instruments. These LEDs only turn on when the button of the corresponding note is pressed; the child thus complements the auditory perception (key of the central stave) with the visual perception (LEDs of the stave of the upper part) and identifies the sound heard with its position in the musical stave.

The central part of the keyboard incorporates another musical stave, wherein the musical notes have been substituted with thirteen buttons. This part allows the child to play the melodies with the buttons of the different musical notes when the product is in the basic operation mode. The basic operation mode can be recognized because it is that in which none of the LEDs of the higher functions is lit up. In the basic operation mode, the stave of the central part of the keyboard operates as if it were an electronic piano.

Each of the thirteen buttons of the central part incorporates its own LED, which will turn on: A) when the chosen function makes the machine sound without needing to press the notes so that the child can see and learn to which note a certain musical sound corresponds as part of a melody; B) in some operations of the higher functions in which they turn on or blink without sounding to indicate which note or button must be pressed to thus obtain and complete a chosen melody or to take part in any of the proposed games.

The lower part of the keyboard is the most complex and is the one containing four control buttons for the higher functions related to lessons and games of the advanced operation mode which provide the assembly of the product with its musical and pedagogical richness. It is formed by eleven buttons and ten LEDs.

The games and lessons are higher functions belonging to the advanced operation mode of the product. These functions require a combination of pressings made in a control button (one of the four buttons mentioned above) and a button of the stave. To facilitate the use thereof, these four functions use similar operating methods so, when the operating method of one of them is learnt, the operating method of the rest is also learnt.

The intention of this novel product is to achieve that when the child presses the button of a certain position of the stave and the corresponding musical note is produced, the reinforcement of the child's memory is achieved so that in his mind the sound of the note is associated with the position of the stave. This way of exercising the memory (memory training process) is accompanied by the activation of several sensory resources which enhance it, since there is a coincidence in time of the pressing of the button of the stave (voluntary motor action of the muscles of the hand), of the hearing of the sound response of the electronically produced note (auditory perception of the ear) and of the vision of the child who focuses his attention on the position of the stave (visual perception of the operation and awareness of having caused the action) which, as a whole, form a revolutionary method for teaching the musical stave.

DESCRIPTION OF THE DRAWINGS

To complement the description which is being made and for the purpose of aiding to better understand the features of the invention, a series of drawings is attached to the present specification as an integral part thereof, in which the following has been depicted with an illustrative and non-limiting character.

PREFERRED EMBODIMENT OF THE INVENTION

Figure 1:
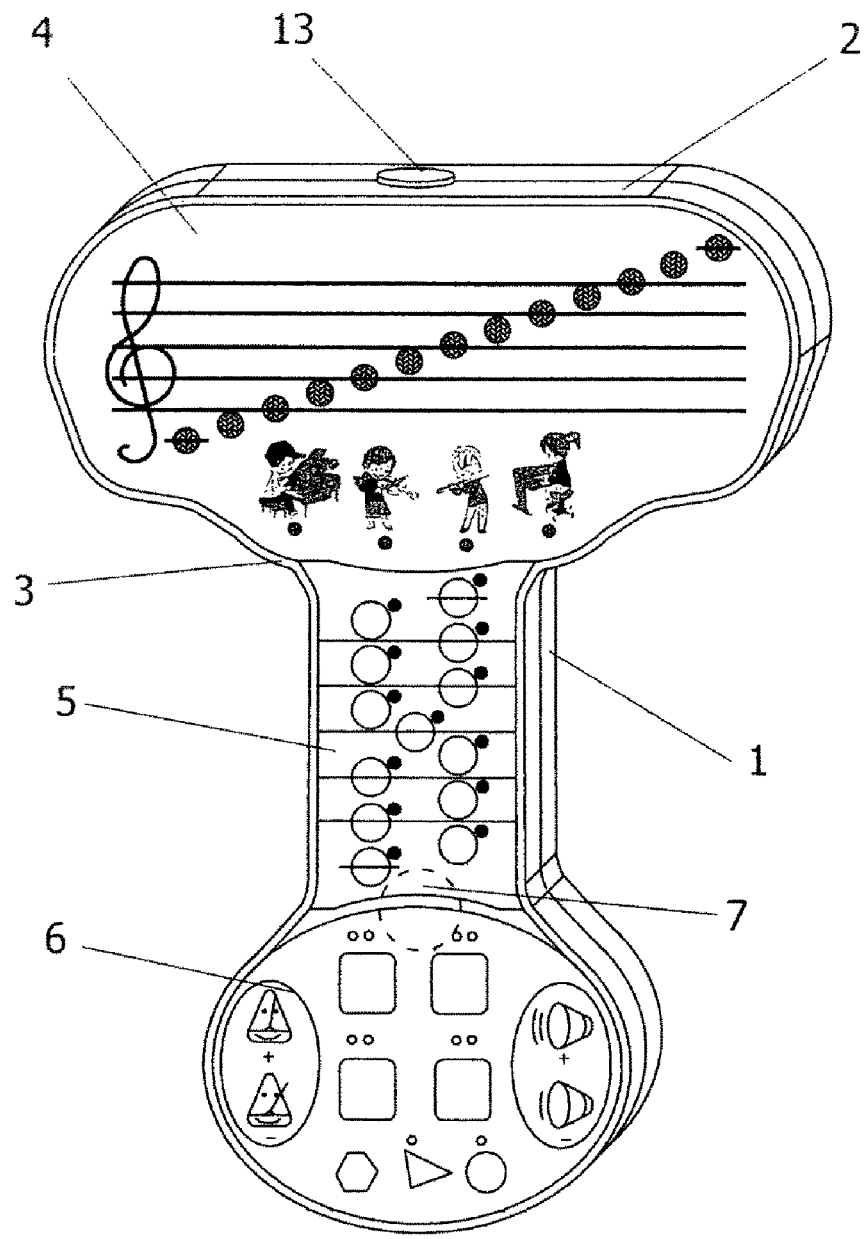
FIG. 1 is a schematic view of the front part of a practical embodiment of the instrument object of the present invention.
Figure 2:
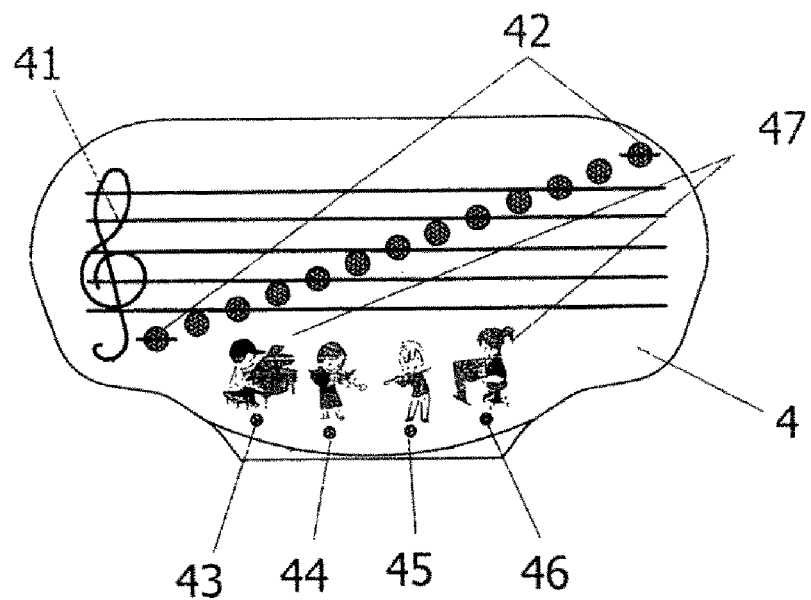
FIG. 2 is a detail of the upper part of the previous view.
Figure 3:
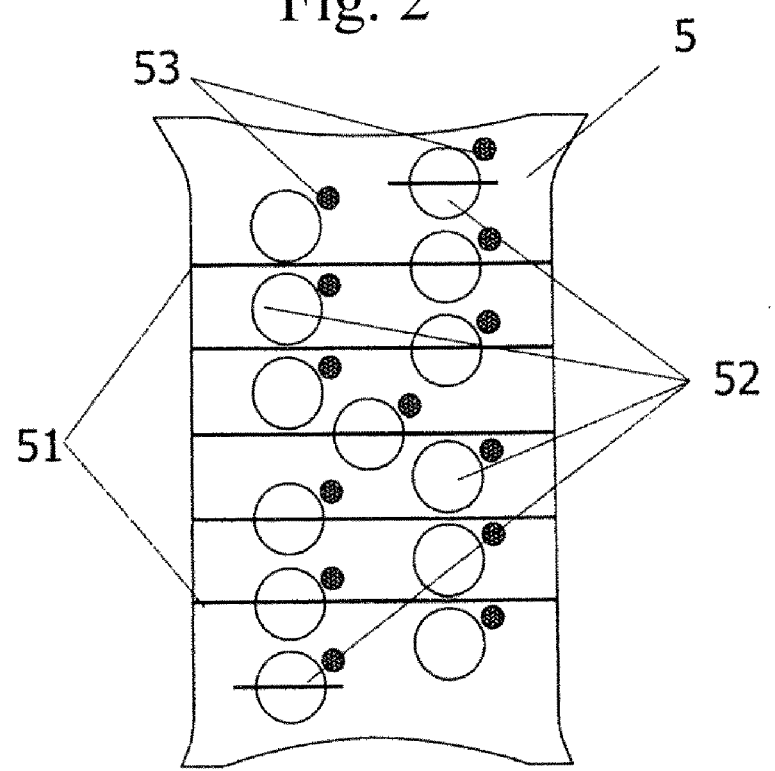
FIG. 3 is a detail of the central part of FIG. 1.
Figure 5:
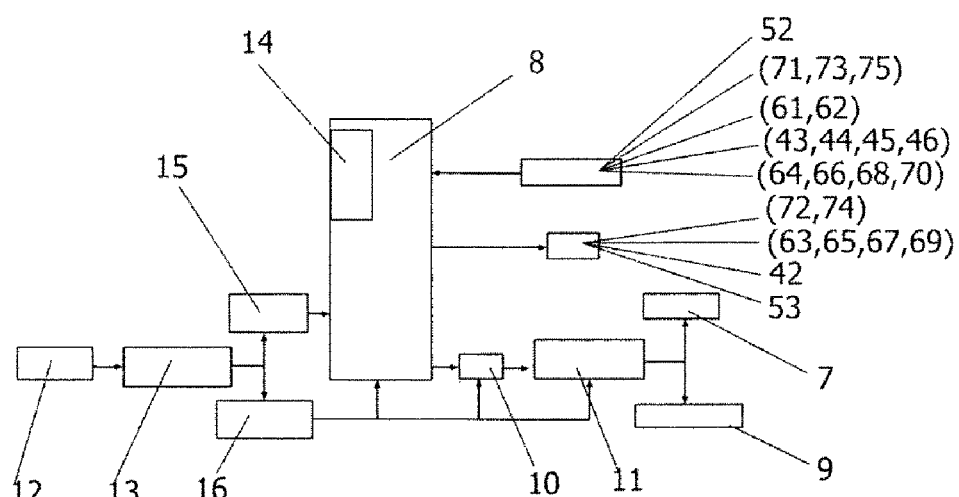
FIG. 5 is a block diagram of the control hardware.
Figure 4:
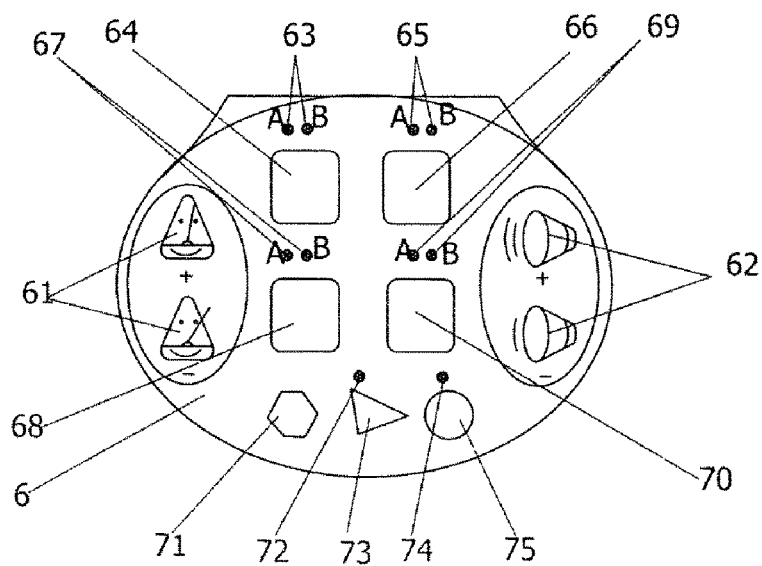
FIG. 4 is a detail of the upper part of FIG. 1.

As can be seen in the figure, there is distinguished a lower casing (1) and an upper casing (2) on which the keyboard (3) of buttons and LEDs is placed, which keyboard is in turn divided into an upper area (4), a central area (5) and a lower area (6), a loudspeaker (7, depicted in a dotted line) in the lower casing (1), an integrated base plate, a processor (8) and a socket for headphones (9).

The keyboard (3) is the interface between the product and the child and consists of a graphic design incorporating control buttons for the product and light-emitting diodes called LEDs. The buttons allow the child to control the different games and lessons incorporated. The LEDs allow the child to see a response of the product.

The upper part of the keyboard (4) shows the musical stave (41) in treble clef with thirteen LEDs (42) in the positions of the musical notes and, below the stave, there are four buttons serving to select the musical instruments, namely: piano LED (43), violin LED (44), flute LED (45) and organ LED (46) with their corresponding images (47) representing each of these instruments.

The central part of the keyboard (5) incorporates another musical stave with the distribution of the notes in a harmonic or vertical manner (51), wherein the musical notes have been substituted with thirteen buttons (52). This part of the keyboard is the one which allows the child to play the melodies with the buttons of the different musical notes when the product is in the basic operation mode. The basic operation mode can be recognized because it is that in which none of the LEDs (63, 65, 67, 69, 72 and 74) of the higher functions is lit up. In the basic operation mode, the stave with the distribution of the notes in a harmonic or vertical manner (51) of the central part of the keyboard operates as if it were an electronic piano. Each of the thirteen buttons (52) incorporates its own LED (53).

Each button (52) generates, through its pressing, an order for emitting a popular or classical melody by means of a link with the memory (14) of pre-recorded melodies.

A complement of these buttons (52) is the possibility of them being marked according to the Braille alphabet, so that the reader can also be used by blind children or users.

The lower part of the keyboard (6) is the most complex of all the parts and is the one containing the control buttons for the higher functions (lessons and games) of the advanced operation mode which provide the assembly of the product with its musical and pedagogical richness. It is formed by eleven buttons and ten LEDs.

The functions of the lower part of the keyboard are detailed below:

TEMPO Function buttons (61), which allow increasing or reducing the tempo of the playing of the musical piece. The first time a piece is invoked, it will be played at its tempo, but it is possible to subsequently modify the tempo by means of the action of these controls.

The VOLUME Function buttons (62) allow increasing or reducing the sound intensity of the notes.

POPULAR MELODIES Function LEDs (63) and button (64), which allow the access to the hearing lessons of a melody in two modes: complete or divided into phrases. The mode of the hearing lesson is selected by means of the number of times that this control button (64) is pressed. The complete hearing lesson will be selected with the first pressing and the phrase hearing lesson will be selected with a second pressing.

CLASSICAL MELODIES LEDs (65) and button (66). This control button allows the access to the hearing lessons of a melody in two modes: complete or divided into phrases. The mode of the hearing lesson is selected by means of the number of times that this control button is pressed. The complete hearing lesson will be selected with the first pressing and the phrase hearing lesson will be selected with a second pressing.

CHILD VERSUS MACHINE COMPETITION Function LEDs (67) and button (68). This control button allows the access to a game serving to exercise the child's musical memory. In this game, the child and the machine collaborate in constructing a melody by adding, each in his turn, a note taken from a certain set of notes. But, before adding his note, the player must correctly play the melody composed by his rival. In this game, the child competes against the machine in two difficulty modes. The difficulty mode is selected by means of the number of times that this control button (68) is pressed. The game with a set of three different notes will be selected with the first pressing, and the game with a set of four different notes will be selected with a second pressing.

CHILD VERSUS CHILD COMPETITION Function LEDs (69) and button (70). In this game, two children collaborate in constructing a melody by adding, each in his turn, a note taken from a certain set of notes. But before adding his note, each player must correctly play the melody composed by his rival. In this game, the children compete against one another in two difficulty modes. The difficulty mode is selected by means of the number of times that this control button is pressed. The game with a set of three different notes will be selected with the first pressing, and the game with a set of four different notes will be selected with a second pressing.

STOP Function button (71).

PLAY Function LED (72) and button (73) to start the playing of the sounds stored in the order in which they were played during the recording.

RECORD Function LEDs (74) and button (75), to delete the stored memory (if any) and start the recording.

There are LEDs (42) located in the musical stave (41) in the places corresponding to the musical notes. These LEDs only turn on when the button (52) of the corresponding note is pressed, the child thus complements the auditory perception (key of the central stave) with the visual perception (LEDs 42 of the stave of the upper part) and identifies the sound heard with its position in the musical stave.

The notes which sound when the buttons (52) are pressed will be played in the sound of the musical instrument selected according to the button (47) which has been pressed.

Each of the thirteen buttons (52) incorporates its own LED (53), which will turn on: 1). when the chosen function makes the machine sound without needing to press the notes so that the child can see and learn to which note a certain musical sound corresponds as part of a melody; 2) in some operations of the higher functions in which they turn on or blink without sounding to indicate which note or button must be pressed to thus obtain and complete a chosen melody or to take part in any of the proposed games.

The games and lessons are higher functions belonging to the advanced operation mode of the product. These functions require a combination of pressings made in a control button (64, 66, 68, 70) and one or several buttons (52) of the stave with the distribution of the notes in a harmonic or vertical manner (51). To facilitate the use thereof, these four functions use similar operating methods. For example, the operating method of the hearing lessons appears in a schematized manner as follows.

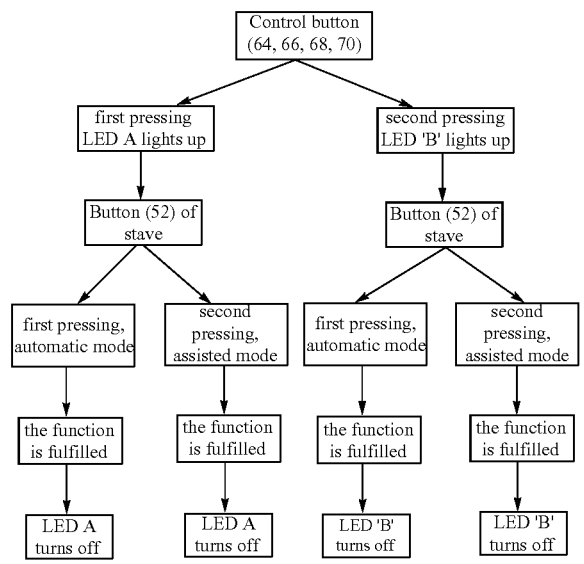

Both for hearing popular melodies and classical melodies, the modus operandi is the same and it is as follows:

The first pressing of the control button (64 or 66) will cause its LED 'A' to light up, the (automatic or assisted) hearing of a recorded melody. The selection of the melody and its presentation mode will be carried out with one of the thirteen buttons (52) of the stave with the distribution of the notes in a harmonic or vertical manner (51)

The first pressing of the selected button (52) will start the automatic and complete hearing of the melody. Together with each note which is played automatically, the corresponding LED (53) in the buttons of the stave will light up. LED 'A' will turn off when the hearing of the melody ends in order to indicate the end of the lesson.

The second pressing of the same selected button (52) will inhibit the automatic hearing and there will be a change to the assisted hearing mode, in which the child is guided so that he himself plays the melody by means of the suitable pressing of the button (52) of the stave with the distribution of the notes in a harmonic or vertical manner (51) which is lit up. Thus, the LED (53) of the button of the stave corresponding to the musical note which must sound will light up so that the child presses said button (52) of the stave which is lit up and the desired sound is produced.

The second pressing of the control button (64 or 66) will cause the LED 'A' which was lit up to turn off and its LED 'B' to light up in order to indicate that work will be done with the (automatic or assisted) hearing lesson of the phrases of a recorded melody. The selection of the melody and its presentation mode will be carried out with one of the thirteen buttons (52) of the stave which the child must press to start the lesson.

The first pressing of the selected button (52) will start the automatic and complete hearing of the phrases of the melody, alternating the sound of a piano and a flute as question and response for each of the phrases. Together with each note which is played automatically, the corresponding LED (53) in the buttons of the stave with the distribution of the notes in a harmonic or vertical manner (51) will light up.

The second pressing of the same selected button (52) will inhibit the automatic hearing and there will be a change to the assisted hearing mode of the phrases of the melody. Firstly, the hearing of the phrase will automatically occur with the sound of the piano so that the child knows what he must memorize. Then, the LED (53) of the button (52) of the stave corresponding to the first note of the same phrase will light up intermittently. Secondly, the child must correctly play the memorized phrase by pressing in the suitable order the buttons (52) of the stave with the distribution of the notes in a harmonic or vertical manner (51) corresponding to the notes of the phrase. A different sound will be used, such as that of the flute for the response thereof.

For the child versus machine and child versus child game, the procedure is similar with the exception of pressing the respective control buttons (68, 70) and that in the case of child versus child, the second child will respond instead of the machine.

In the game of the set of three different notes, the first pressing of the control button (68, 70) will cause its LED 'A' to light up in order to indicate that the game will be with a set of three different notes. The child must then press one of the thirteen buttons (52) of the stave to select one of the thirteen possible sets of notes and the notes of the selected set will sound and turn on consecutively. This will occur three consecutive times. When the repetitions end, the child must press one of the buttons of the notes of the selected set. The machine will respond by repeating what the child has played and will add one more note which it will have chosen from among the notes of the selected set. While the machine responds, the LED (53) of the button (52) corresponding to the sound which is sounding will light up. The turn passes to the child who will observe that the LED (53) of the button corresponding to the first note of the melody will be lit up intermittently, and will respond by repeating what the machine has played and will add one more note selected from among the notes of the selected set. The game will continue in this way, the turn being passed between the child and the machine and the melody growing in size until the child makes a mistake in his response, at which time a discordant sound will be produced to indicate to the child that he has made a mistake. LED 'A' will turn off to indicate the end of the game.

The second pressing of the control button (68, 70) will cause its LED 'B' to light up in order to indicate that the game will be with a set of four different notes. The child must then press one of the thirteen buttons (52) of the stave with the distribution of the notes in a harmonic or vertical manner (51) to select one of the thirteen possible sets of notes. The sets of notes are organized from least to most difficulty. Once the button of the stave is pressed, the notes of the selected set will sound and turn on consecutively. This will occur three consecutive times. When the repetitions end, the child must press one of the buttons of the notes of the selected set. The machine will respond by repeating what the child has played and will add one more note which it will have chosen from among the notes of the selected set. While the machine responds, the LED (52) of the button corresponding to the sound which is sounding will light up so that the child can identify the position of the note. The turn will pass to the child who will observe that the LED of the button corresponding to the first note of the melody will be lit up intermittently, and will respond by repeating what the machine has played and will add one more note which he will have chosen from among the notes of the selected set. The game will continue in the same way as in the previous case. LED 'B' will turn off to indicate the end of the game.

All the operating process is controlled by a microcontroller (8) containing the computer application. The push-buttons available in the membrane keyboard are read by the microcontroller and, depending on the push-button pressed by the child, the microcontroller makes a decision and executes a response which, for example, can be a sound signal, through the loudspeaker (7) or headphones (9), or a visual signal, through the LEDs (42, 53). Most of the time, the sound and light signals are closely linked and occur simultaneously, for example, to play a musical note, since the note would be heard and the LED corresponding to that note in the musical stave would be seen.

To generate the audio, two integrated circuits placed in cascade have been used. The first of them is a digital/analog converter (10) which is in charge of converting the digital signal coming from the microcontroller (8) into an analog signal. The second integrated circuit is an audio amplifier (11) which is in charge of generating an electric signal capable of energizing a loudspeaker (7) and generating a sound audible by the human ear. The audio amplifier (11) is also in charge of managing that the sound is heard through the loudspeaker or through the headphones (9).

For the power supply of the product, batteries (12) generating the power supply voltage are used. By means of an ON/OFF switch (13), located at the upper part of the product, the batteries are connected to the electronic circuit or they are disconnected.

Having sufficiently described the nature of the present invention, as well as a practical application thereof, it must only be added that both its shape and the materials and execution thereof can be modified, provided that such modifications do not substantially affect the features which are claimed below:

The invention claimed is:

1. A musical stave reader for children, as a tool for teaching musical language, comprising a loudspeaker (7), the reader also incorporating a socket for headphones (9), and a keyboard (4) the musical stave reader comprising
   a lower casing (1) and an upper casing (2) on which the keyboard (3) of buttons and LEDs is placed, wherein the keyboard comprises:
      an upper part (4), wherein the upper part of the keyboard (4) shows the musical stave (41) in treble clef with thirteen LEDs (42) in positions of musical notes;
      a central part (5), wherein the central part of the keyboard (5) incorporates another musical stave with a distribution of notes in a harmonic or vertical manner (51),
      a lower part (6), wherein first plurality of buttons (61) of the lower part (6) access control of a Tempo Function, and a second plurality of buttons (62) of the lower part (6) access a Volume Function and the lower part (6) of the keyboard includes a third plurality of control buttons for higher functions of lessons and games of an advanced operation mode, which is formed by eleven buttons and ten LEDS, including a Stop Function button (71), a Play Function LED (72) and a button (73) to start playing of sounds stored in an order in which they were played during a recording, a Record Function LED (74) and button (75) and
   an integrated base plate; and
   a processor (8) controlling the entire operation and containing the computer application which reads pressings of the buttons available in the keyboard (3);
   wherein depending on the buttons pressed by the user, the processor makes a decision and executes a response;
   wherein the reader has two operation modes, a basic operation mode and the advanced operation mode, in which the basic operation mode is recognized because none of the LEDs (63, 65, 67, 69, 72 and 74) associated with the advanced operation mode are lit up;
   wherein in the basic operation mode, the vertical stave (51) of the central part of the keyboard operates as if it were an electronic piano.

2. The musical stave reader for children of claim 1, wherein the upper part (4) of the keyboard has four buttons (47) intended for selecting a corresponding musical instrument.

3. The musical stave reader for children of claim 2, wherein the buttons (47) of the upper part (4) of the keyboard are associated with respective LEDs, namely: piano LED (43), violin LED (44), flute LED (45) and organ LED (46) with their corresponding images representative of each of these instruments.

4. The musical stave reader for children of claim 1 wherein the central part (5) of the keyboard comprises thirteen buttons (52).

5. The musical stave reader for children of claim 4 wherein each of the thirteen buttons (52) incorporates its own LED (53) and is associated with a different sound of a musical scale.

6. The musical stave reader for children of claim 5 wherein an LED (53) associated with a sound will turn on when a chosen function makes a musical stave reader sound without needing to press notes so that a child can see and learn to which note a certain musical sound corresponds as part of a melody; and when an operation of the advanced operation mode turns the LED (53) on or causes the LED (53) to blink without sounding to indicate which note or button must be pressed to thus obtain and complete a chosen melody or to take part in proposed games.

7. The musical stave reader for children of claim 5 wherein the central part (5) is the part of the keyboard in which a user is allowed, through a link with memory (14) of pre-recorded melodies, to play the pre-recorded melodies with the buttons (52) of the different sounds of the musical scale when in the basic operation mode.

8. The musical stave reader for children of claim 5 wherein each button (52), connects with a popular melody or a classical melody in the advanced operation mode.

9. The musical stave reader for children of claim 1, further comprising a control button (64) corresponding to Popular Melodies Function LEDs (63), wherein when the control button (64) is depressed, access to a program of hearing lessons of a melody in two modes: complete, or divided into phrases; and wherein the mode of the hearing lesson is selected by means of a number of times that the control button (64) is pressed; the complete hearing lesson selected with a first pressing and a phrase hearing lesson selected with a second pressing.

10. The musical stave reader for children of claim 1, further comprising a control button (66) corresponding to Classical Melodies Function LEDs (65), wherein when the control button (66) is depressed, access to a program of hearing lessons of a melody in two modes: complete, or divided in phrases; and wherein the mode of the hearing lesson is selected by means of a number of times that the control button is pressed; the complete hearing lesson selected with a first pressing and a phrase hearing lesson selected with a second pressing.

11. The musical stave reader for children of claim 1, further comprising a control button (68) corresponding to Child Versus Machine Competition Function LEDs (67), wherein when the control button (68) is depressed, access to a program of a game in which a child and the musical stave reader collaborate in constructing a melody by adding, each in his turn, a note taken from a certain set of notes.

12. The musical stave reader for children of claim 1, further comprising a control button (70) corresponding to Child Versus Child Competition Function LEDs (69), wherein when the control button (70) is depressed, access to a program of a game in which two children collaborate in constructing a melody by adding, each in his turn, a note taken from a certain set of notes.

13. The musical stave reader for children of claim 11 wherein a difficulty mode of the game is selected by means of a number of times that the control button (68) is pressed, such that the game with a set of three different notes will be selected with a first pressing, and the game with a set of four different notes will be selected with a second pressing.

14. The musical stave reader for children of claim 1, wherein the higher functions of lessons and games of the advanced operation mode are activated through a combination of pressings made with a control button (64, 66, 68, 70) and one or several buttons (52) of the stave with the distribution of the notes in the harmonic or the vertical manner (51).

15. The musical stave reader for children of claim 14 wherein a first pressing of the control button (64 or 66) causes LED 'A' to light and starts an automatic or assisted mode of hearing of a recorded melody; the selection of the recorded melody and its presentation mode is carried out with one of thirteen buttons (52) of the stave with the distribution of the notes in the harmonic or the vertical manner (51).

16. The musical stave reader for children of claim 15 wherein the first pressing of one of the thirteen selected buttons (52) of the stave will start an automatic and complete hearing of a melody, wherein together with each note which is played automatically, the corresponding LED (53) of the each of the thirteen selected buttons of the stave light up.

17. The musical stave reader for children of claim 16 wherein a second pressing of the same one of the thirteen selected buttons (52) inhibits the automatic and complete hearing of the melody and changes to an assisted hearing mode; the LED (53) of the button of the stave reader corresponding to the musical note which sounds lights up so that a child presses the button (52) of the stave which is lit up and a desired sound is produced.

18. The musical stave reader for children of claim 14 wherein a second pressing of the control button (64 or 66) turns off LED 'A' which was lit up, and lights up LED 'B' to indicate the starting of hearing lesson of phrases of a pre-recorded melody, in which the selection of the pre-recorded melody and its presentation mode is carried out with one of the thirteen buttons (52) of the stave.

19. The musical stave reader for children of claim 18 wherein the first pressing of one of the thirteen selected buttons (52) starts automatic and complete hearing of phrases of the pre-recorded melody, alternating a sound of a piano and a flute as a question and response for each of the phrases, together with a note which is played automatically, the corresponding LED (53) of each of the thirteen selected buttons of the stave light up.

20. The musical stave reader for children of claim 19 wherein a second pressing of one of the thirteen selected buttons (52) inhibits automatic hearing and changes to an assisted hearing mode of phrases of a melody.

21. The musical stave reader for children of claim 14 wherein a first pressing of the control button (68, 70) lights up LED 'A' to indicate that a game will be with a set of three different notes and subsequent pressing of one of the thirteen selected buttons (52) of the stave selects one of thirteen possible sets of notes and the notes of the selected set will sound and turn on consecutively.

22. The musical stave reader for children of claim 14 wherein a second pressing of the control button (68, 70) lights LED 'B' and indicates that a game will be with a set of four different notes, and the pressing of one of the thirteen selected buttons (52) of the stave with the distribution of the notes in the harmonic or the vertical manner (51) selects one of thirteen possible sets of notes.

23. The musical stave reader for children of claim 21 wherein a difficulty mode of the game is selected by means of a number of times that the control button (70) is pressed, such that the game with a set of three different notes will be selected with the first pressing.

24. The musical stave reader for children of claim 22 wherein a difficulty mode of the game is selected by means of a number of times that the control button (70) is pressed, such that the game with a set of four different notes will be selected with a second pressing.

* * * * *